United States Patent
Vogt et al.

(10) Patent No.: US 6,566,293 B1
(45) Date of Patent: May 20, 2003

(54) CATALYST COMPOSITION WITH HIGH EFFICIENCY FOR THE PRODUCTION OF LIGHT OLEFINS

(75) Inventors: Eelco Titus Carel Vogt, Culemborg (NL); Augusto R. Quinones, Amstelveen (NL); Paul O'Connor, Hoevelaken (NL)

(73) Assignee: Akzo Nobel N.V., Arnhem (NL)

( * ) Notice: Subject to any disclaimer, the term of this patent is extended or adjusted under 35 U.S.C. 154(b) by 30 days.

(21) Appl. No.: 09/715,721

(22) Filed: Nov. 17, 2000

Related U.S. Application Data

(60) Provisional application No. 60/166,896, filed on Nov. 22, 1999.

(30) Foreign Application Priority Data

Jan. 12, 2000 (EP) .............................................. 00200092

(51) Int. Cl.⁷ .............................. B01J 29/40; B01J 29/08
(52) U.S. Cl. .............................. 502/67; 502/64; 502/68; 502/71; 502/77; 502/79; 502/214
(58) Field of Search .............................. 502/64, 67, 68, 502/77, 79, 208, 214, 71

(56) References Cited

U.S. PATENT DOCUMENTS

| | | | |
|---|---|---|---|
| 4,423,266 A | * 12/1983 | Young | 208/135 |
| 4,873,211 A | * 10/1989 | Walker et al. | 502/214 |
| 5,110,776 A | 5/1992 | Chitnis et al. | 502/64 |
| 5,126,298 A | 6/1992 | Absil et al. | 502/68 |
| 5,231,064 A | 7/1993 | Absil et al. | 502/68 |
| 5,318,696 A | * 6/1994 | Kowalski | 208/120.1 |
| 5,380,690 A | 1/1995 | Zhicheng et al. | 502/65 |
| 5,456,821 A | 10/1995 | Absil et al. | 208/114 |
| 5,472,594 A | 12/1995 | Tsang et al. | 208/114 |
| 5,521,133 A | 5/1996 | Koermer et al. | 502/9 |
| 6,080,303 A | * 6/2000 | Cao et al. | 208/113 |
| 6,211,104 B1 | * 4/2001 | Shi et al. | 502/64 |
| 2002/0049133 A1 | * 4/2002 | Ziebarth et al. | 502/64 |

FOREIGN PATENT DOCUMENTS

| | | | |
|---|---|---|---|
| EP | 0 503 876 | 9/1992 | C10G/11/05 |
| EP | 0 511 013 | 10/1992 | C07C/4/06 |
| EP | 0 909 582 | 4/1999 | B01J/29/06 |
| NL | 9301333 | 10/1994 | B01J/29/28 |
| WO | WO 94/13754 | 6/1994 | C10G/11/05 |
| WO | WO 98/41595 | 9/1998 | C10G/11/05 |

* cited by examiner

Primary Examiner—Tom Dunn
Assistant Examiner—Christina Ildebrando
(74) Attorney, Agent, or Firm—Louis A. Morris

(57) ABSTRACT

The present invention is directed to a catalyst composition for FCC which has high efficiency in the production of light olefins while maintaining the bottoms conversion. The catalyst composition is prepared by:

a) ex situ activating an olefin-selective zeolite with at least 10 wt % of a phosphorus-containing compound, calculated as $P_2O_5$ based on the total amount of olefin-selective zeolite.

b) combining the activated olefin-selective zeolite with 10–40 wt % catalytic cracking component, binder, and 0–25 wt % silica in a slurry, so that the total amount of amorphous alumina present in the final catalyst composition is at least 10 wt %, and c) spray-drying the slurry to form catalyst particles.

6 Claims, No Drawings

CATALYST COMPOSITION WITH HIGH EFFICIENCY FOR THE PRODUCTION OF LIGHT OLEFINS

CROSS REFERENCE TO RELATED APPLICATION

This application claims priority from U.S. Provisional Application Serial No. 60/166,896, filed Nov. 22, 1999, the content of which is incorporated herein in its entirety.

BACKGROUND OF THE INVENTION

1. Field of the Invention

The present invention is directed to a catalyst composition for FCC which has high efficiency in the production of $C_3$ and $C_5$ olefins, i.e. light olefins.

2. Prior Art

In FCC practice, there are two ways to increase light olefin selectivity. The first of these is to increase the reaction temperature. This will increase the contribution of thermal cracking, which leads to increased formation of lighter products. For instance, in the so-called DCC (Deep Catalytic Cracking) process, a specific type of FCC process, higher temperatures and increased amounts of steam are used. However, thermal cracking is not very selective and produces large amounts of products of relatively little value, such as hydrogen, methane, ethane, and ethylene, in the "wet gas" (which contains $H_2$ and $C_1$–$C_4$ products). Wet gas compression often limits refinery operation.

The second method is to add an olefin-selective, zeolite-containing additive such as a ZSM-5-containing additive. Conventional additives usually contain phosphorus-activated ZSM-5, which selectively converts primary cracking products (e.g., gasoline olefins) to $C_3$ and $C_4$ olefins. Improvement of the activity or the selectivity with phosphorus is known to increase the effectiveness of ZSM-5. For instance, EP-A- 511 013 describes the treatment of ZSM-5 with phosphorus to increase the propylene selectivity. Further, U.S. Pat. No. 5,472,594 describes a process for converting a hydrocarbon feed to a product containing improved yields of $C_4/C_5$ olefins with a catalyst composition containing zeolite Y and an additive comprising a phosphorus-containing medium pore zeolite such as ZSM-5. Also Mobil's WO 98/41595 describes a process for the catalytic cracking of a hydrocarbon feedstock to produce an enhanced yield of $C_3$ to $C_5$ olefins using a catalyst composition comprising a large pore molecular sieve such as zeolite Y and an additive comprising a phosphorus-containing ZSM-5 blended in with the base catalyst containing zeolite Y. The same is described in U.S. Pat. No. 5,456,821. WO 94/13754 describes the same process using a catalyst composition containing a large pore molecular sieve and an additive containing a specific ZSM-5 which optionally contains 1.5 to 5.5 wt % elemental phosphorus. Also U.S. Pat. No. 5,521,133 describes the preparation of a ZSM-5 additive by injecting a ZSM-5 and kaolin slurry with phosphoric acid prior to spray-drying.

Additives, however, dilute the catalyst inventory and will decrease bottoms conversion. In the past, it was tried to incorporate phosphorus-activated ZSM-5 as a component into FCC catalyst compositions. In U.S. Pat. No. 5,110,776 a phosphorus treatment was used to improve the attrition resistance of catalyst compositions. Here a Y zeolite is treated with a phosphorus-containing aqueous solution, and said treated zeolite is directly combined with a matrix precursor to form a slurry. Said slurry is spray-dried. The matrix precursor used comprises up to 3.4 wt % alumina, about 25 wt % clay, and about 45 wt % silica. Although. it is mentioned that ZSM-5 may be used, all of the examples are directed to the use of zeolite Y. The above-described U.S. Pat. No. 5,472,594 mentions mixing of the phosphorus-activated ZSM-5 with a matrix and Y zeolite and spray-drying to form an FCC catalyst, but gives no indication of how this can be done, nor of the type of matrix to be used. The examples only describe ZSM-5 additives which are mechanically mixed with base catalysts. Mobil's U.S. Pat. Nos. 5,126,298 and 5,231,064 describe the preparation of a catalyst composition by providing a zeolite slurry and two types of clay slurries, treating at least one of these slurries with a source of phosphorus, combining the slurries, and spray-drying at a pH of below 3. The catalyst matrix described here does not contain any added silica and/or alumina. As will be explained below, phosphorus-activated olefin-selective zeolites such as ZSM-5 can only be incorporated into a catalyst composition as a component when specific measures are taken.

Conventional FCC catalyst compositions which are also suitable for bottoms cracking contain a catalytic cracking component and amorphous alumina. Catalytic cracking components are either crystalline, such as zeolite Y and zeolite X, or amorphous, such as silica-alumina. Amorphous alumina is necessary to provide the bottoms conversion. Amorphous alumina may also be used as a binder to provide the matrix with enough binding function to properly bind the crystalline cracking component when present. Thus, said amorphous alumina is either present in the matrix, i.e. an active matrix is used, or in the amorphous cracking component in the form of silica-alumina. In other words, a catalyst composition with good bottoms conversion contains at least 10 wt % amorphous alumina. By the term amorphous alumina is meant an alumina which comprises bottoms cracking activity. This means that some crystallinity may be present. It was found that when the phosphorus compound used for activation of the olefin-selective zeolite is added to the catalyst, strike, i.e. the spray-drying slurry containing the matrix components and the catalytic cracking component, it interferes with the amorphous alumina present in the strike. As a result, at present no catalyst compositions are on the market which effectively combine olefin-selective zeolites with high amounts of alumina either in the matrix or in the amorphous cracking component. The object of the present invention is to provide a catalyst composition, with a high light olefin selectivity while maintaining the bottoms conversion.

SUMMARY OF THE INVENTION

In one embodiment, the present invention is directed to a process for the preparation of a catalyst composition comprising the following steps:

a) ex situ activating an olefin-selective zeolite with at least 10 wt % of a phosphorus-containing compound, calculated as $P_2O_5$ based on the total amount of olefin-selective zeolite, b) combining the activated olefin-selective zeolite with 10–40 wt % catalytic cracking component, binder, and 0–25 wt % silica in a slurry so that the total amount of amorphous alumina in the final catalyst composition is at least 10 wt %, and spray-drying the slurry to form catalyst particles.

In a second embodiment, the present invention comprises a catalyst composition comprising:

a) 10 to 40 wt % catalytic cracking component,
b) 0.1 to 85 wt % ex situ phosphorus-treated olefin-selective zeolite, wherein the olefin-selective zeolite is treated with at least 10 wt % phosphorus-containing compound, calculated as $P_2O_5$ based on the total amount of olefin-selective zeolite,
c) binder,
d) 0–25 wt % silica, wherein the total amount of amorphous alumina in the final catalyst composition is at least 10 wt %.

Other embodiments of the invention encompass details about process steps and conditions and catalyst compositions, all of which are hereinafter disclosed in the following discussion of each of the facets of the present invention.

DETAILED DESCRIPTION OF THE INVENTION

In the process of the present invention, the olefin-selective zeolite is activated ex situ, before it is added to a conventional FCC catalyst formulation. Ex situ activation of olefin-selective zeolite is achieved by treating the zeolite with a phosphate source, followed by drying and calcination. Subsequently, the activated olefin-selective zeolite is added to the catalyst matrix. It was found that the ex situ activation of olefin-selective zeolite immobilizes the phosphate enough to avoid its interference with the catalyst matrix or catalytic cracking component after addition thereto. This allows the olefin-selective zeolite to exert its selective cracking on the primary products, while not diluting the inventory. Thus, the refiner can actually lower the riser top temperature, which will allow a lower "wet gas" make, while also the contribution of the Y-zeolite to the $C_3$- and $C_4$-selectivity will be lowered. At the same time, the bottoms conversation will be maintained, because the matrix activity can be tailored to the formulation. It must be noted that Sinopec's EP-A1-0909-582 describes ex situ phosphorus activation. It describes the preparation of a catalyst composition for the production of light olefins by mixing the matrix components, adding a mixture of a Y-type zeolite and a high silica zeolite with pentasil structure such as ZSM-5 containing 2–8 wt % (based on the weight of the zeolite) of phosphorus (calculated as $P_2O_5$) and 0.3–3 wt % of aluminum or magnesium or calcium. The zeolite mixture is treated with an aqueous solution of phosphorus/aluminum or phosphorus/magnesium or calcium compounds, dried, and calcined prior to the addition to the matrix components. The amounts of phosphorus used here are not sufficient to obtain a high light olefin yield. NL-9301333 describes the ex situ activation of ZRP zeolite with an aluminum phosphate sol. Said activated ZRP zeolite is incorporated into a catalyst composition containing zeolite Y, clay and organic oxides.

As was mentioned above, the ex situ activation comprises contacting the olefin-selective zeolite with a phosphorus-containing compound in solution or liquid. A suitable phosphorus-containing compound, i.e. any phosphorus-containing compound having a covalent or ionic constituent capable of reacting with hydrogen ion, may be employed, for example phosphoric acid and its salts such as ammonium dihydrogen phosphate and diammonium hydrogen phosphate, ammonium hypophosphate, ammonium orthophosphate, ammonium dihydrogen orthophosphate, ammonium hydrogen orthophosphate, triammonium phosphate, phosphines, and phosphites. Suitable phosphorus-containing compounds include derivatives of groups represented. by $PX_3$, $RPX_2$, $R_2PX$, $R_1P$, $R_3P=O$, $RPO_2$, $RPO(OX)_2$, $PO(OX)_3$, $R2P(O)OX$, $RP(OX)_2$, $ROP(OX)_2$, and $(RO)_2POP(OR)_2$, wherein R is an alkyl or phenyl radical and X is hydrogen, R or halide. These compounds include primary, $RPH_2$, secondary, $R_2PH$, and tertiary, $R_3P$, phosphines such as butyl phosphine; tertiary phosphine oxides, $R_3PO$, such as tributyl phosphine; primary, $RP(O)(OX)_2$, and secondary, $R_2P(O)OX$, phosphonic acids such as benzene phosphonic acid; esters of the phosphonic acids such as diethyl phosphonate, $(RO)_2P(O)H$, dialkyl phosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites; and esters thereof such as monopropyl ester, alkyldialkyl phosphinites, $(RO)P_2$, and dialkyl phosphonite, $(RO)_2PR$ esters. Examples of phosphite esters include trimethyl phosphite, triethyl phosphite, diisopropyl phosphite, butyl phosphite; and pyrophosphites such as tetrapyrophosphite. The alkyl groups in the mentioned compounds contain 1 to 4 carbon atoms. Other suitable phosphorus-containing compounds include phosphorus halides such as phosphorus trichloride, bromide, and iodide, alkyl phosphorodichloridites, $(RO)PCl_2$, dialkyl phosphorochloridites, $(RO)_2PCl$, alkyl phosphonochloridates, $(RO)(R)P(O)Cl$, and dialkyl phosphinochloridates, $R_2P(O)Cl$.

The reaction of the olefin-selective zeolite with the phosphorus-containing compound is effected by contact. Where the phosphorus-containing compound is a liquid, said compound can be used per se or in solution in a solvent. If a solid compound is used, it must be dissolved so as to ensure contact with the olefin-selective zeolite.

It is preferred to use phosphorus-containing compounds which do not leave undesirable metals on the olefin-selective zeolite. Therefore, the addition of sodium, aluminium, calcium, and magnesium salts is not advised. If phosphorus-containing compounds are used which do not contain metal ions which are undesired on olefin-selective zeolites, such as ammonium dihydrogen phosphate and diammonium hydrogen phosphate, ammonium hypophosphate, ammonium orthophosphate, ammonium dihydrogen orthophosphate, ammonium hydrogen orthophosphate, triammonium phosphate, and organic phosphates, phosphines, and phosphates, there is no need to filter the phosphate-containing compound/olefin-selective zeolite mixture prior to the drying step.

Olefin-selective zeolites are defined as zeolites having a silica/alumina ratio above 10, preferably above 15, and up to 12 rings. Examples of suitable olefin-selective zeolites are MFI-type zeolites, MEL-type zeolites such as ZSM-11, ZSM12, MTW-type zeolites such as ZSM-12, MWW-type zeolites such as MCM-22, MCM-36, MCM-49, MCM-56, and BEA-type zeolites such as zeolite beta. MFI-type zeolites are preferred.

MFI-type zeolites are as defined in the *ATLAS OF ZEOLITE STRUCTURE TYPES*, W. M. Meier and D. H. Olson, 3rd revised edition (1992), Butterworth-Heinemann, and include ZSM-5, ST-5, ZSM-8, ZSM-11, silicalite, LZ-105, LZ-222, LZ-223, LZ-241, LZ-269, L2-242, AMS-1B, AZ-1, BOR-C, Boralite, Encilite, FZ-1, NU-4, NU-5, T5-1, TSZ, TSZ-III, TZ01, TZ, USC-4, USI-108, ZBH, ZB-11, ZBM-30, ZKQ-1B, ZMQ-TB. It should be noted that the ZRP zeolite as described in NL 9301333 is not considered a MFI-type zeolite within the context of this description.

After treatment with the phosphorus-containing compound, the treated olefin-selective zeolite is dried and subsequently calcined at a temperature between 300 and 1000° C., preferably between 450 and 700° C., for about 15 minutes to 24 hours.

It was found that the olefin-selective zeolite should be treated with at least 10 wt % of the phosphorus-containing compound, calculated as $P_2O_5$ based on the total amount of olefin-selective zeolite, to ensure proper light olefin selectivity, but it is preferred to use at least 12 wt % of the phosphorus-containing compound, calculated as $P_2O_5$ based on the total amount of olefin-selective zeolite.

In general, it is preferred to adjust the pH of the olefin-selective zeolite/phosphorus-containing compound mixture to 4.5 or above, for instance with ammonia, before drying in order to avoid any undesirable acid attack of the zeolite or active matrix.

After ex situ activation, the activated olefin-selective zeolite is combined with the catalytic cracking component, binder, and silica. Catalytic cracking components are either crystalline, such as zeolite Y and zeolite X, or amorphous, such as silica-alumina. Suitable zeolites Y and zeolite X are all zeolites Y and zeolites X which are normally used in FCC catalyst compositions and which may be in the hydrogen form, the ammonium form, or in ion exchanged form, e.g. one or more rare earth metals. Examples are dealuminized zeolite Y, silica-enriched dealuminated zeolite Y, and ultrastable zeolite Y (USY). The zeolite Y and zeolite X may also be treated with a phosphorus-containing compound. Also combinations of catalytic cracking components may be used.

As mentioned above, the amount of amorphous alumina in the final catalyst composition should be at least 10 wt % so as to ensure sufficient bottoms cracking activity. When silica-alumina is present as the catalytic cracking component, the alumina present herein provides bottoms cracking. In that case, any binder may be used, as long as the total amount of amorphous alumina the final catalyst composition is at least 10 wt %. Suitable binders are alumina binders, alumina-silica binders or silica binders. Said binders are all aluminas, silicas, and silica-aluminas which are normally applied in FCC catalyst compositions. The alumina binder may be (pseudo)boehmite or alumina sol. Usually, the alumina binder is peptized before or during its combination with the other catalyst composition components. Further, silica and/or crystalline alumina maybe present in the strike and optionally fillers such as clay, for instance kaolin, are used. Usually, up to 20 wt % binder, preferably alumina binder, is present in the final catalyst composition, but also higher amounts may be applied.

The various catalyst components can be combined in any sequence, but it is preferred to add the phosphorus-treated, olefin-selective zeolite to the strike last, so as to avoid any interference of the phosphorus with the amorphous alumina. It is further preferred to add the phosphorus-treated, olefin-selective zeolite separately from the zeolite Y, so as to avoid any interference with the catalytic cracking component.

It is preferred to use zeolite Y as the catalytic cracking component, because this provides extremely suitable catalyst compositions.

As the catalyst composition resulting from the above-described process appears to have improved properties compared with known catalyst compositions, the present invention is also directed to the previously described catalyst composition obtainable by the process of the invention.

The invention is further directed to a catalyst composition wherein the olefin-selective zeolite is treated with at least 12 wt % phosphorus-containing compound, calculated as $P_2O_5$ based on the total amount of olefin-selective zeolite.

Said catalyst composition can suitably be used in the catalytic cracking of hydrocarbon feedstocks and has high efficiency in the production of light olefins while maintaining the bottoms conversion. The catalyst composition may also be used in the so-called DCC process even when using lower temperatures than usual in DCC processes.

The present invention is further illustrated by the following non-limiting Examples.

EXAMPLES

Example 1

Ex Situ Activation of ZSM-5

ZSM-5 with a SAR of 25 was slurried, to obtain a 30% slurry. $H_3PO_4$ was added to levels of 2, 6, 8, 10, 15, and 20 wt % $P_2O_5$ on ZSM-5, respectively. The pH was adjusted to above 4.5 with ammonia. The mixture was dried at 120° C. overnight and calcined at 600° C. for 1 hour. 5 wt % ex situ-activated ZSM-5 was added as the last component to a strike containing 13.5 wt % REY zeolite, 18 wt % peptized pseudoboehmite, and 5 wt % silica. The strike was spray-dried. The catalyst compositions were steamed for 20 hours at 788° C. The physical properties of the catalyst compositions are listed in TABLE 1.

Example 2

Calcination at Different Temperatures

Example 1 was repeated using $H_3PO_4$ levels of 2 and 6 wt % (as $P_2O_5$) on ZSM-5, respectively. Now, the calcination temperature was 400° C., with the other conditions being the same as in Example 1. The physical properties of the resulting catalyst composition appeared to be approximately the same as for the catalyst composition obtained with calcining at 600° C.

Comparative Example 3
Additive with Base Catalyst

For comparison a base catalyst was prepared with the formulation 15 wt % REY, 20 wt % peptized pseudoboehmite, and 5 wt % silica, which was blended with 10 wt % commercially available ZSM-5 zeolite additive containing 25 wt % ZSM-5 [ZCAT HP® ex Intercat]. This is the way commercially available additives are usually applied. The catalyst blend was steamed for 20 hours at 788° C. The physical properties of this comparative catalyst blend are listed in TABLE 1 as ex. 3*.

of phosphorus-containing compound ex situ-activated ZSM-5 to form a catalyst composition containing 20 wt % Type-Y zeolite, 25 wt % peptized pseudoboehmite, and 12 wt % silica. The catalyst composition was steamed for 20 hours at 788° C.

Comparative Example 6
Base Catalyst

For comparison a base catalyst was prepared with the same formulation as Example 5, except for the activated ZSM-5 The base catalyst was steamed for 20 hours at 788° C.

TABLE 1

Physical properties of catalyst compositions

|  | sample 1 | sample 2 | sample 3 | sample 4 | sample 5 | sample 6 | ex. 3* |
|---|---|---|---|---|---|---|---|
| wt % $P_2O_5$ added | 2 | 6 | 8 | 10 | 15 | 20 |  |
| $Al_2O_3$ | 46.61 | 46.55 | 46.34 | 46.11 | 44.59 | 46.31 | 34.16 |
| $SiO_2$ | 48.31 | 48.05 | 48.54 | 48.51 | 49.57 | 48.22 | 59.78 |
| $NA_2O$ | 0.16 | 0.15 | 0.15 | 0.23 | 0.93 | 0.16 | 0.16 |
| $RE_2O_3$ | 2.15 | 2.18 | 2.21 | 2.22 | 1.96 | 2.21 | 2.22 |
| $P_2O_5$ (measured) | 0.14 | 0.29 | 0.39 | 0.45 | 0.76 | 0.71 | 1.29 |
| PSD | 69.67 | 65.75 | — | 83.04 | 73.55 | 60.25 | 66.63 |
| PV | 0.38 | 0.38 | 0.38 | 0.38 | 0.37 | 0.38 | 0.51 |
| $SA_{bet}$ | 198 | 190 | 197 | 191 | 189 | 188 | 194 |
| $SA_{bet}$ (steamed) | 114 | 117 | 120 | 123 | 117 | 119 | 114 |

Example 4
Propylene Yield

The various catalyst compositions were tested using Kuwait vacuum gas oil as a feedstock. The performance at catalyst to oil ratio 4 is reported in TABLE 2. It was acceptable to report at constant catalyst to oil ratio instead of at constant conversion because the difference in activity was minimal, so that the overall ranking was not changed by this.

TABLE 2

Performance of the catalyst compositions

|  | Propylene yield | butylene yield | LPG yield |
|---|---|---|---|
| sample 1 (2% $P_2O_5$) | 7.86 | 8.02 | 23.74 |
| sample 2 (6% $P_2O_5$) | 8.81 | 8.51 | 25.35 |
| sample 3 (8% $P_2O_5$) | 8.78 | 8.40 | 24.89 |
| sample 4 (10% $P_2O_5$) | 8.82 | 8.48 | 24.97 |
| sample 5 (15% $P_2O_5$) | 9.47 | 8.50 | 25.98 |
| sample 6 (20% $P_2O_5$) | 9.76 | 8.73 | 26.66 |
| Ex 3* | 9.10 | 8.57 | 25.66 |

These results show that with catalyst composition having ex situ-activated olefin-selective zeolite incorporated into the catalyst composition, a propylene yield can be obtained which is comparable with that obtained when using commercially available additives, as long as the olefin-selective zeolite is treated ex situ with at least 10 wt % (as $P_2O_5$) of phosphorus-containing compound. Although a good propylene yield can be obtained with the use of ZSM-5 additives, the bottoms cracking could not help but be reduced owing to the dilution effects of additives in the catalyst inventory.

Example 5
Ex Situ-activated ZSM-5-containing Catalyst Composition

Another catalyst composition was prepared using the process as described in Example 1 using 15 wt % (as $P_2O_5$)

Example 7
Propylene Yield and Bottoms Conversion of Base Catalyst and ZSM-containing Catalyst Composition The catalyst composition of Example 5 and the base catalyst of Comparative example 6 were tested using the same feedstock. The performance at catalyst to oil ratio 5 is reported in TABLE 3.

TABLE 3

Performance of a catalyst composition vs. a base catalyst

|  | Catalyst composition of Ex.5 | Base catalyst of Comparative ex. 6 |
|---|---|---|
| Conversion, wt % | 73.13 | 71.07 |
| Propylene yield, wt % | 6.21 | 4.61 |
| bottoms yield, wt % | 11.75 | 14.59 |

These results show that a catalyst composition having ex situ-activated olefin-selective zeolite incorporated therein gives a higher activity than can be obtained with a base catalyst, providing a higher propylene yield and leaving less bottoms, i.e. with higher bottoms cracking.

What is claimed is:

1. Process for the preparation of a catalyst composition comprising the following steps:
   a) ex situ activating an olefin-selective zeolite with at least 10 wt % of a phosphorus-containing compound, calculated as $P_2O_5$ based on the total amount of olefin-selective zeolite,
   b) combining the activated olefin-selective zeolite with 10–40 wt % catalytic cracking component, binder, and 0–25 wt % silica in a slurry, so that the total amount of amorphous alumina present in the final catalyst composition is at least 10 wt %, and c) spray-drying the slurry to form catalyst particles,
wherein the total amount of amorphous alumina in the final catalyst composition is at least 10 wt %,
wherein the phosphorus-containing compound is not a sodium, aluminium, calcium, or magnesium salt.

2. The process of claim 1 wherein the olefin-selective zeolite is a MFI-type zeolite.

3. The process of claim 1 wherein the catalytic cracking component is a zeolite Y.

4. The process according of claim 1 wherein the olefin-selective zeolite is treated with at least 12 wt % of a phosphorus-containing compound, calculated as $P_2O_5$ based on the total amount of olefin-selective zeolite.

5. The process of claim 1 wherein the ex situ activation comprises:
   a) contacting the olefin-selective zeolite with a phosphorus-containing compound in solution or liquid,
   b) drying the treated olefin-selective zeolite, and
   c) calcining the treated, dried, olefin-selective zeolite at a temperature between 300 and 1,000° C.

6. The process of claim 5 wherein the pH of the olefin-selective zeolite/phosphorus-containing compound mixture is adjusted to 4.5 or above.

* * * * *